(12) United States Patent
Lin

(10) Patent No.: US 7,675,751 B2
(45) Date of Patent: Mar. 9, 2010

(54) FRAME-TYPE COMPUTER COOLING DEVICE

(75) Inventor: Pei-Hsi Lin, Sijhih (TW)

(73) Assignee: Thermaltake Technology Co., Ltd. (TW)

( * ) Notice: Subject to any disclaimer, the term of this patent is extended or adjusted under 35 U.S.C. 154(b) by 0 days.

(21) Appl. No.: 12/174,737

(22) Filed: Jul. 17, 2008

(65) Prior Publication Data

US 2009/0290299 A1 Nov. 26, 2009

(30) Foreign Application Priority Data

May 20, 2008 (TW) .............................. 97208770 U

(51) Int. Cl.
*H05K 7/20* (2006.01)
(52) U.S. Cl. ................. 361/699; 361/689; 361/690; 361/700; 165/80.4; 165/104.33; 62/259.2
(58) Field of Classification Search ................. None
See application file for complete search history.

(56) References Cited

U.S. PATENT DOCUMENTS

| | | | | |
|---|---|---|---|---|
| 5,365,749 A | * | 11/1994 | Porter | 62/259.2 |
| 5,963,425 A | * | 10/1999 | Chrysler et al. | 361/695 |
| 6,587,343 B2 | * | 7/2003 | Novotny et al. | 361/698 |
| 6,845,625 B1 | * | 1/2005 | Pokharna | 62/118 |
| 6,968,709 B2 | * | 11/2005 | Goth et al. | 62/259.2 |
| 7,055,341 B2 | * | 6/2006 | Nori et al. | 62/259.2 |
| 7,318,322 B2 | * | 1/2008 | Ota et al. | 62/259.2 |
| 7,342,787 B1 | * | 3/2008 | Bhatia | 361/700 |
| 2009/0178425 A1 | * | 7/2009 | Tsuchiya | 62/259.2 |

* cited by examiner

*Primary Examiner*—Boris L Chervinsky
(74) *Attorney, Agent, or Firm*—Schmeiser, Olsen & Watts, LLP

(57) ABSTRACT

A frame-type computer cooling device for installation in a host computer is provided. The host computer has a heat-generating source and a slot compartment. The slot compartment communicates with the inside of the host computer and the outside of the host computer. The frame-type computer cooling device includes a frame and a cooling circulation device. The frame is insertedly disposed in the slot compartment and includes a receiving recess. The cooling circulation device includes an evaporator, a compressor, a condenser, and an expansion valve connected to one another by a pipeline filled with a coolant. The compressor, the condenser, and the expansion valve are received in the receiving recess. The evaporator adjoins the heat-generating source. Accordingly, the cooling circulation device is easy to install, and heat dissipation of the heat-generating source is swift and efficient.

7 Claims, 5 Drawing Sheets

FRAME-TYPE COMPUTER COOLING DEVICE

BACKGROUND OF THE INVENTION

1. Field of the Invention

The present invention relates to frame-type computer cooling devices, and more particularly, to a frame-type computer cooling device easy to install and efficient in dissipating heat from a heat-generating source in a host computer.

2. Description of Related Art

Recent years see evolution of ever-changing technologies, and thus computers are indispensable to the handling of routine at both an individual level and a corporate level. To be increasingly versatile, computers nowadays are equipped with an increasing number of electronic components more complicated than ever before, for example, CPU, chips, and expansion cards. All the electronic components in operation generate heat and thereby become so-called heat-generating sources. The heat generated by the electronic components is ever-increasing because of a continuous increase in both the data processed by computers and the speed thereof.

Usual means to heat dissipation of the aforesaid heat-generating sources are, namely cooling fans, cooling fins, heat pipes, and other heat-dissipating components. In this regard, a cooling circulation device is one of the feasible means to enhancement of efficiency in heat dissipation.

Nonetheless, cooling circulation devices are composed of various components, namely evaporators, compressors, condensers, expansion valves, etc. It is well known that host computers are equipped with a variety of electronic parts and electronic devices, thus leaving little usable space. Despite their high efficiency in heat dissipation, the cooling circulation devices mentioned above pose a challenge in space utilization when installed in host computers.

Accordingly, the purpose of the present invention is to disclose a frame-type computer cooling device easy to install and efficient in dissipating heat from a heat-generating source in a host computer.

SUMMARY OF THE INVENTION

In view of the aforesaid drawbacks of a conventional cooling circulation device for use in computer heat dissipation, the inventor of the present invention realized the room for improvement of the prior art. Hence, the inventor endeavored to devise a frame-type computer cooling device based on the inventor's expertise and experience in the art. The frame-type computer cooling device is easy to install and efficient in dissipating heat from a heat-generating source in a host computer.

It is a primary objective of the present invention to provide a frame-type computer cooling device easy to install and efficient in dissipating heat from a heat-generating source in a host computer by the improvement of the structure.

To achieve the above and other objectives, the present invention provides a frame-type computer cooling device for installation in a host computer having a heat-generating source and a slot compartment. The slot compartment communicates with the inside of the host computer and the outside of the host computer.

The frame-type computer cooling device of the present invention mentioned above comprises a frame and a cooling circulation device. The frame is insertedly disposed in the slot compartment and comprises a receiving recess. The cooling circulation device comprises an evaporator, a compressor, a condenser, and an expansion valve connected to one another by a pipeline filled with a coolant. The compressor, the condenser, and the expansion valve are received in the receiving recess. The evaporator adjoins the heat-generating source of the host computer.

With the above structure, the cooling circulation device is easy to install, and heat dissipation of the heat-generating source in the host computer is swift and efficient.

DETAILED DESCRIPTION OF THE EMBODIMENTS

The present invention is herein illustrated with specific embodiments and drawings, so that one skilled in the pertinent art can easily understand the objective, features, other advantages and effects of the present invention from the disclosure of the invention.

Figure 1:
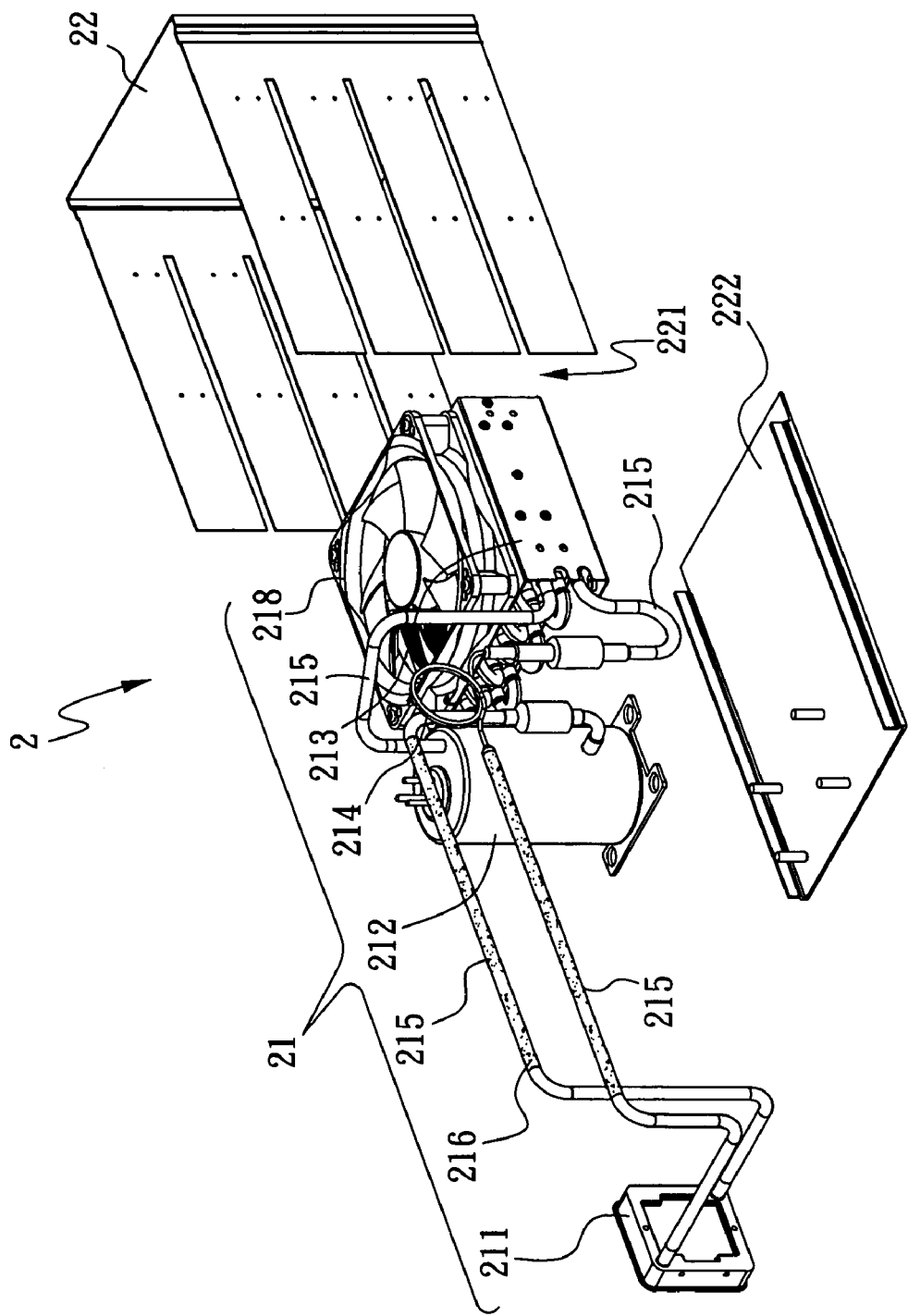
FIG. 1 is an exploded view of a first preferred embodiment of the present invention.
Figure 2:
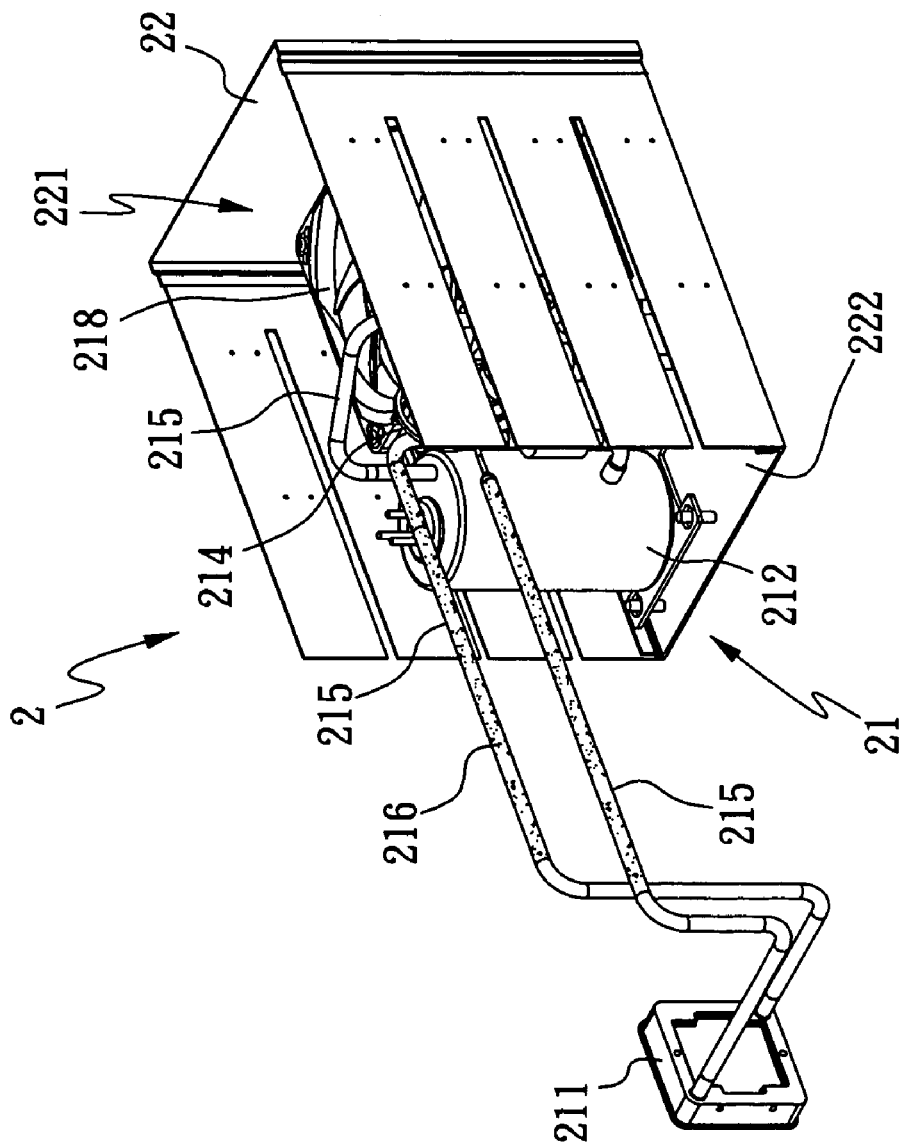
FIG. 2 is a three dimensional view of the first preferred embodiment of the present invention.

Referring to FIG. 1 and FIG. 2, FIG. 1 is an exploded view of a first preferred embodiment of the present invention. FIG. 2 is a three dimensional view of the first preferred embodiment of the present invention. As shown in the drawings, a frame-type computer cooling device 2 of the present invention comprises a frame 22 and a cooling circulation device 21.

As shown in the drawings, the frame 22 comprises a receiving recess 221 and a bottom plate 222, and the cooling circulation device 21 comprises an evaporator 211, a compressor 212, a condenser 213, and an expansion valve 214. The evaporator 211, the compressor 212, the condenser 213, and the expansion valve 214 are connected to one another by a pipeline 215. The pipeline 215 is filled with a coolant 216. The compressor 212, the condenser 213, and the expansion valve 214 are received in the receiving recess 221 of the frame 22 and disposed on the bottom plate 222.

In the first preferred embodiment, the pipeline 215 mentioned above is a soft hose or a hard pipe. In addition, a cooling fan 218 is disposed above the condenser 213.

Figure 3:
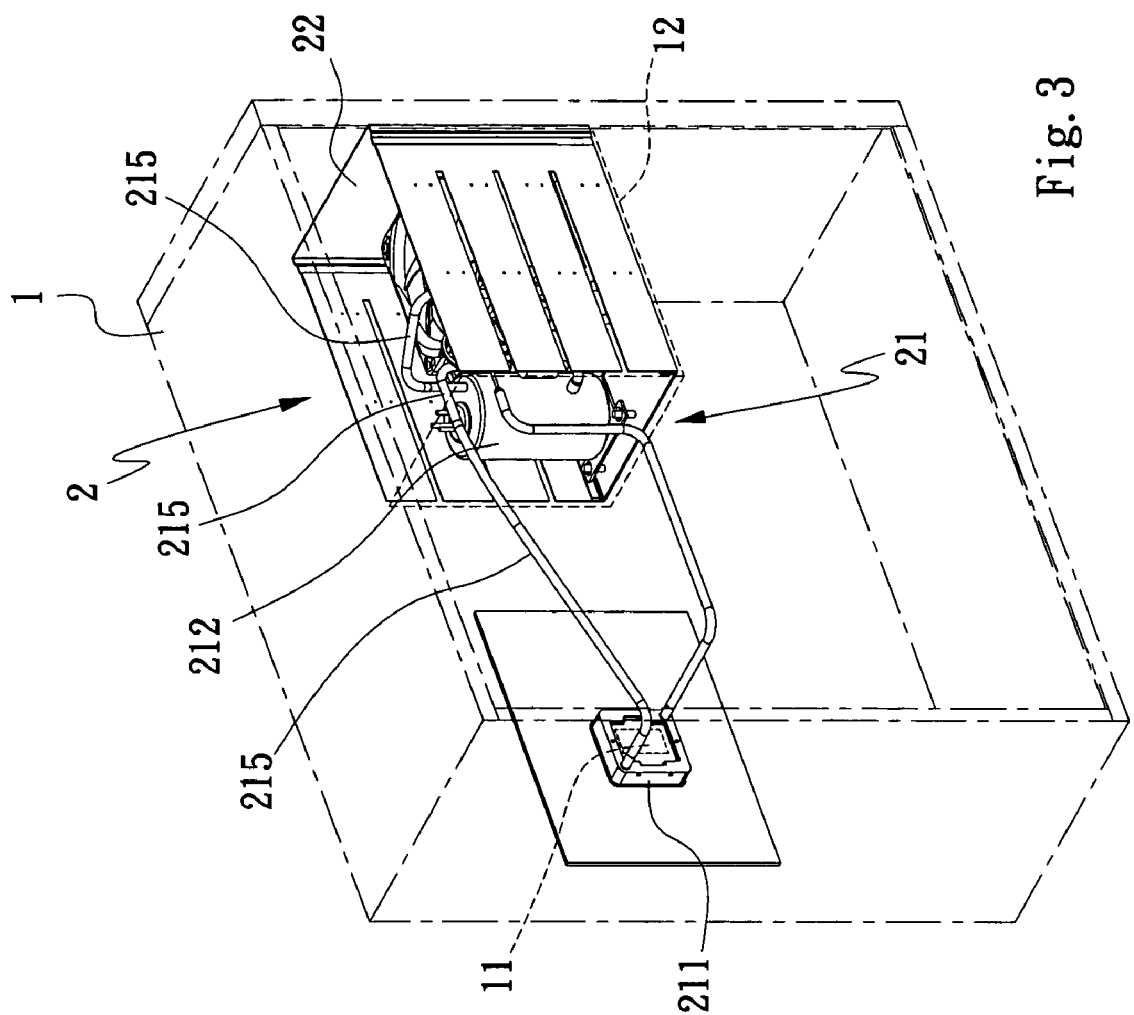
FIG. 3 is a schematic view showing the use of the first preferred embodiment of the present invention.

Referring to FIGS. 1, 2 and 3, FIG. 3 is a schematic view showing the use of the first preferred embodiment of the present invention. As shown in the drawings, the frame-type computer cooling device 2 is installed in a host computer 1. The host computer 1 comprises a heat-generating source 11 and a slot compartment 12. The slot compartment 12 communicates with the inside of the host computer 1 and the outside of the host computer 1. In the first preferred embodiment, the heat-generating source 11 is a CPU.

Additionally, as regards installation, the frame 22 is insertedly disposed in a slot compartment 12 of the host computer 1, and the evaporator 211 of the cooling circulation device 21 adjoins the heat-generating source 11 of the host computer 1.

In the first preferred embodiment, the slot compartment 12 of the host computer 1 is 4U-sized, and the frame 22 is 4U-sized. The notation "4U", a jargon in wide use in the computer industry, refers to the dimensions of the slot compartment 12 and the frame 22 or the dimensions of a server, and comes in various degrees, such as 1U, 2U, etc. Hence, the aforesaid notation is well understood by persons ordinarily skilled in the art and therefore is not described in detail herein.

With the above structure, heat dissipation of the heat-generating source 11 of the host computer 1 takes place by means of cooling circulation. The principle of cooling circulation of the evaporator 211, the compressor 212, the condenser 213, and the expansion valve 214 is a general thermofluidic principle and therefore well understood by persons skilled in the art.

With the above structure, moreover, installation of the frame 22 and the cooling circulation device 21 in the host computer 1 is convenient and free of the problems facing the prior art, such as space utilization. In other words, with the above structure, installation of the cooling circulation device 21 is easy and convenient, and thus heat from the heat-generating source 11 in the host computer 1 is dissipated swiftly and efficiently.

Figure 4:
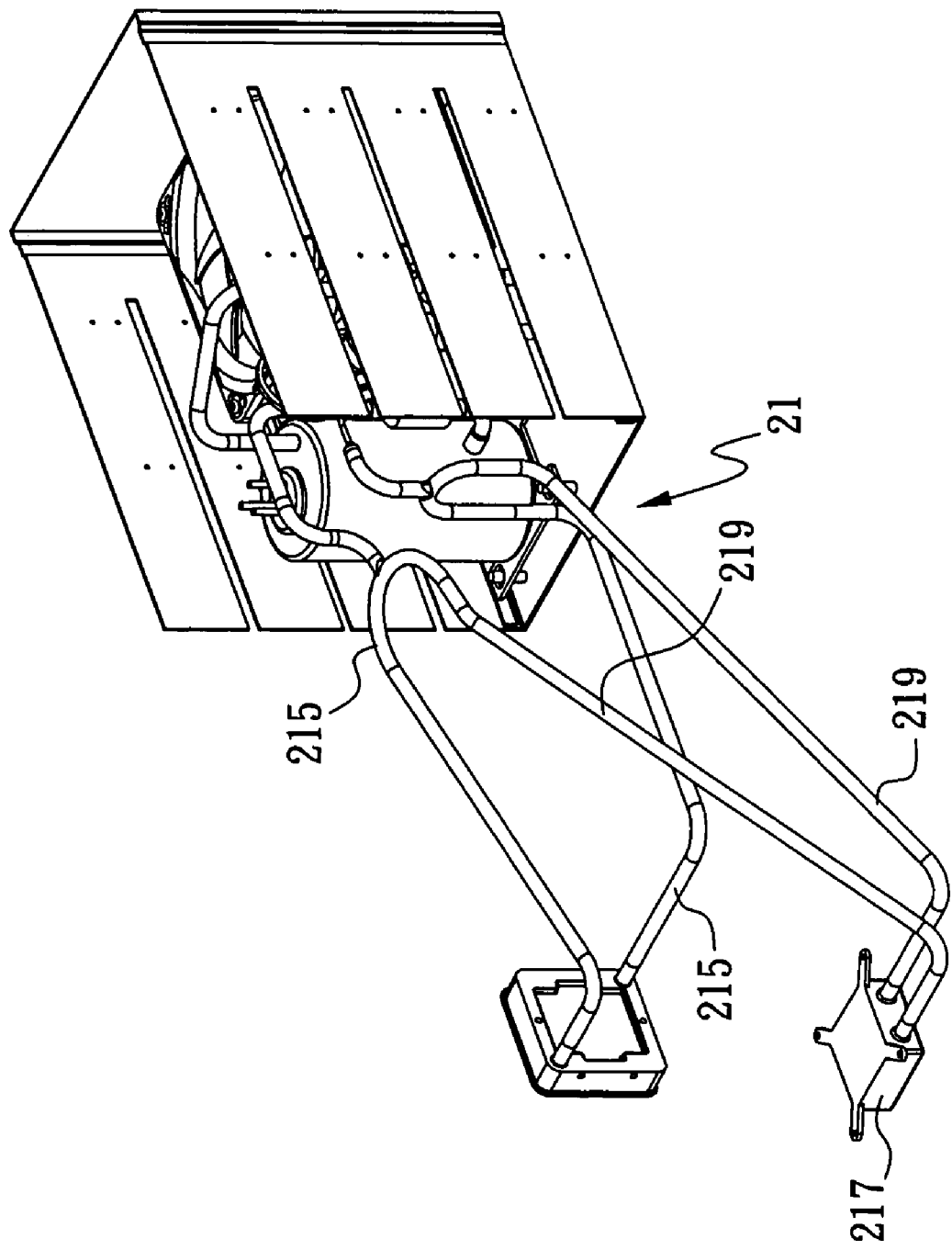
FIG. 4 is a three dimensional view of a second preferred embodiment of the present invention.
Figure 5:
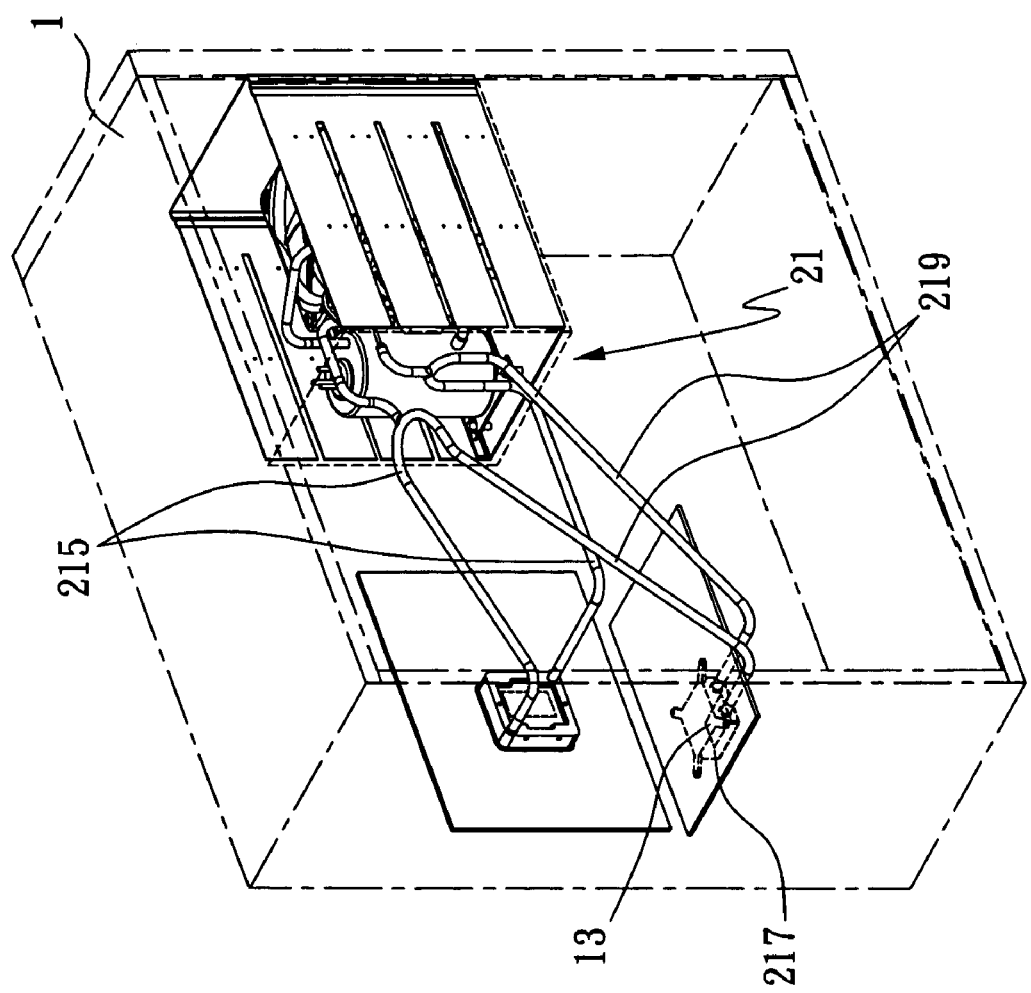
FIG. 5 is a schematic view showing the use of the second preferred embodiment of the present invention.

Referring to FIG. 4 and FIG. 5, FIG. 4 is a three dimensional view of a second preferred embodiment of the present invention. FIG. 5 is a schematic view showing the use of the second preferred embodiment of the present invention.

The second preferred embodiment is substantially the same as the first preferred embodiment in main structures, but the second preferred embodiment is distinguished from the first preferred embodiment by the following features of the second preferred embodiment: the host computer 1 further comprises another heat-generating source 13, such as a chip; the cooling circulation device 21 further comprises another evaporator 217; the evaporator 217 adjoins the heat-generating source 13; the pipeline 215 is connected to another pipeline 219 in parallel; and the pipeline 219 is connected to another evaporator 217. Likewise, the pipeline 219 is a soft hose in this embodiment.

Therefore, the above structure can vary flexibly when necessary. That is, for instance, where a host computer has a plurality of heat-generating sources, synchronous heat dissipation of the heat-generating sources can be accomplished by the above structure.

The purpose of parallel connection of pipelines is to preclude a problem which might otherwise occur when pipelines are connected in series, that is, series-connected pipelines are less efficient in heat dissipation, because heat from a heat-generating source affects the next heat-generating source.

In conclusion, the present invention meets the three patentability criteria, namely not anticipated (novelty), not obvious (non-obviousness), and useful (industrial applicability). The present invention is neither anticipated nor obvious, as the improved structure disclosed in the present invention provides ease of installation and enables efficient heat dissipation of a heat-generating source in a host computer. The present invention has industrial applicability, as products derived from the present invention can meet current market needs.

It is apparent to those skilled in the art that the foregoing specific embodiments are only illustrative of the features and functions of the present invention but are not intended to restrict the scope of the present invention. It is noted that all equivalent modifications and variations made in the foregoing embodiment should fall within the scope of the invention. Accordingly, the disclosure of the present invention should be defined by the appended claims.

What is claimed is:

1. A frame-type computer cooling device comprising:
   a frame insertedly disposable in a slot compartment of a host computer, the slot compartment communicating with an inside of the host computer and an outside of the host computer, the slot compartment comprising a receiving recess; and
   a cooling circulation device comprising an evaporator, a compressor, a condenser, and an expansion valve connected to one another by a pipeline filled with a coolant, wherein the compressor, the condenser, and the expansion valve are received in the receiving recess, the evaporator adjoining the heat-generating source;
   wherein the frame, the evaporator, the compressor, the condenser and the expansion valve are each mountable within a housing of the host computer.

2. The frame-type computer cooling device of claim 1, wherein the frame further comprises a bottom plate, and the compressor, the condenser, and the expansion valve are received in the receiving recess and disposed on the bottom plate.

3. The frame-type computer cooling device of claim 1, wherein the host computer further comprises another heat-generating source, and the cooling circulation device further comprises another evaporator adjoining said another heat-generating source, wherein the pipeline is parallel-connected to another pipeline connected to said another evaporator.

4. The frame-type computer cooling device of claim 1, wherein the condenser is provided with a cooling fan.

5. The frame-type computer cooling device of claim 1, wherein the pipeline is a soft hose.

6. The frame-type computer cooling device of claim 3, wherein said another pipeline is a soft hose.

7. A frame-type computer cooling device comprising:
   a frame insertedly disposable in a slot compartment of a host computer, the slot compartment communicating with an inside of the host computer and an outside of the host computer, the slot compartment comprising a receiving recess; and
   a cooling circulation device comprising an evaporator, a compressor, a condenser, and an expansion valve connected to one another by a pipeline filled with a coolant, wherein the compressor, the condenser, and the expansion valve are received in the receiving recess, the evaporator adjoining the heat-generating source;
   wherein the slot compartment is 4U sized, and the frame is 4U-sized.

* * * * *